(12) United States Patent
Washeleski et al.

(10) Patent No.: US 7,449,852 B2
(45) Date of Patent: Nov. 11, 2008

(54) POWERED PANEL MOVING SYSTEM

(75) Inventors: John M. Washeleski, Cadillac, MI (US); Stephen R. W. Cooper, Fowlerville, MI (US); Peter H. Strom, Big Rapids, MI (US); Todd R. Newman, Traverse City, MI (US)

(73) Assignee: Nartron Corporation, Reed City, MI (US)

( * ) Notice: Subject to any disclaimer, the term of this patent is extended or adjusted under 35 U.S.C. 154(b) by 0 days.

(21) Appl. No.: 11/906,279

(22) Filed: Oct. 1, 2007

(65) Prior Publication Data

US 2008/0030156 A1 Feb. 7, 2008

Related U.S. Application Data

(63) Continuation of application No. 11/079,016, filed on Mar. 11, 2005, now Pat. No. 7,312,591.

(51) Int. Cl.
*H02P 1/00* (2006.01)
(52) U.S. Cl. .................. 318/280; 317/283; 317/266; 317/466
(58) Field of Classification Search .............. 318/245, 318/254, 266, 283, 434, 466, 280
See application file for complete search history.

(56) References Cited

U.S. PATENT DOCUMENTS

| | | | |
|---|---|---|---|
| 3,710,209 A | 1/1973 | Webb et al. | |
| 3,875,481 A | 4/1975 | Miller et al. | |
| 3,951,250 A | 4/1976 | Pointon et al. | |
| 3,964,594 A | 6/1976 | Gabbrielli et al. | |
| 3,965,399 A | 6/1976 | Walker, Jr. et al. | |
| 4,132,487 A | 1/1979 | Fisher | |
| 4,186,524 A | 2/1980 | Pelchat | |
| 4,266,263 A | 5/1981 | Haberl et al. | |
| 4,369,663 A | 1/1983 | Venturello et al. | |
| 4,370,697 A | 1/1983 | Haberl et al. | |
| 4,373,122 A | 2/1983 | Frame | |
| 4,373,124 A | 2/1983 | Frame | |
| 4,437,138 A | 3/1984 | Nicol | |
| 4,453,112 A | 6/1984 | Sauer et al. | |
| 4,503,732 A | 3/1985 | Schust | |

(Continued)

FOREIGN PATENT DOCUMENTS

DE 37 34 023 A 4/1989

(Continued)

*Primary Examiner*—Paul Ip
(74) *Attorney, Agent, or Firm*—Brooks Kushman P.C.

(57) ABSTRACT

A powered panel moving system includes a motor, electronic drive circuitry, mechanics, a coupler, and electronic anti-entrapment circuitry. The drive circuitry drives a rotor of the motor such that the rotor has a rotational output in response to being driven. The mechanics moves a panel upon being driven. The coupler couples the rotational output of the rotor to the mechanics in order drive the mechanics for the mechanics to move the panel. The anti-entrapment circuitry controls the drive circuitry to prevent the panel from entrapping an object. The drive circuitry drives the motor based on measurements indicative of at least one of motor current, motor speed, and panel position. The drive circuitry and the anti-entrapment circuitry are integrated with one another such that the anti-entrapment circuitry controls the drive circuitry based on the same measurements.

25 Claims, 7 Drawing Sheets

U.S. PATENT DOCUMENTS

| | | |
|---|---|---|
| 4,521,685 A | 6/1985 | Rebman |
| 4,526,043 A | 7/1985 | Boie et al. |
| 4,584,625 A | 4/1986 | Kellogg |
| 4,662,771 A | 5/1987 | Roe et al. |
| 4,731,548 A | 3/1988 | Ingraham |
| 4,758,735 A | 7/1988 | Ingraham |
| 4,831,279 A | 5/1989 | Ingraham |
| 4,839,512 A | 6/1989 | Speck |
| 4,843,891 A | 7/1989 | Brunner et al. |
| 4,933,807 A | 6/1990 | Duncan |
| 4,976,337 A | 12/1990 | Trett |
| 4,983,896 A | 1/1991 | Sugiyama et al. |
| 5,036,275 A | 7/1991 | Munch et al. |
| 5,087,825 A | 2/1992 | Ingraham |
| 5,131,401 A | 7/1992 | Westenskow et al. |
| 5,142,822 A | 9/1992 | Beckerman |
| 5,159,316 A | 10/1992 | Lazzara |
| 5,210,490 A | 5/1993 | Munch et al. |
| 5,216,364 A | 6/1993 | Ko et al. |
| 5,217,280 A | 6/1993 | Nykerk et al. |
| 5,334,876 A | 8/1994 | Washeleski et al. |
| 5,436,539 A | 7/1995 | Wrenbeck et al. |
| 5,447,076 A | 9/1995 | Ziegler |
| 5,459,962 A | 10/1995 | Bonne et al. |
| 5,483,414 A | 1/1996 | Turtiainen |
| 5,621,290 A | 4/1997 | Heller et al. |
| 5,625,980 A | 5/1997 | Teich et al. |
| 5,642,043 A | 6/1997 | Ko et al. |
| 5,654,615 A | 8/1997 | Brodsky |
| 5,730,165 A | 3/1998 | Philipp |
| 5,775,332 A | 7/1998 | Goldman |
| 5,789,915 A | 8/1998 | Ingraham |
| 5,796,183 A | 8/1998 | Hourmand |
| 5,801,340 A | 9/1998 | Peter |
| 5,851,026 A | 12/1998 | Schoos et al. |
| 5,880,421 A | 3/1999 | Tsuge et al. |
| 5,907,213 A | 5/1999 | Oshima et al. |
| 5,949,207 A | 9/1999 | Luebke et al. |
| 5,952,801 A | 9/1999 | Boisvert et al. |
| 6,006,386 A | 12/1999 | Mohaupt |
| 6,038,930 A | 3/2000 | Lehnen et al. |
| 6,064,165 A | 5/2000 | Boisvert et al. |
| 6,075,298 A | 6/2000 | Maue et al. |
| 6,081,088 A | 6/2000 | Ishihara et al. |
| 6,142,513 A | 11/2000 | Schoos et al. |
| 6,233,872 B1 | 5/2001 | Glagow et al. |
| 6,288,464 B1 | 9/2001 | Turii et al. |
| 6,297,605 B1 | 10/2001 | Butler et al. |
| 6,297,609 B1 | 10/2001 | Takahashi et al. |
| 6,304,048 B1 | 10/2001 | Davies et al. |
| 6,320,335 B1 | 11/2001 | Saitou |
| 6,337,549 B1 | 1/2002 | Bledin |
| 6,377,009 B1 | 4/2002 | Philipp |
| 6,389,752 B1 | 5/2002 | Rosenau |
| 6,404,158 B1 | 6/2002 | Boisvert et al. |
| 6,483,054 B2 | 11/2002 | Suzuki et al. |
| 6,499,359 B1 | 12/2002 | Washeleski et al. |
| 6,515,399 B1 | 2/2003 | Lauf et al. |
| 6,580,242 B2 * | 6/2003 | Hirose et al. ............... 318/445 |
| 6,661,642 B2 | 12/2003 | Allen et al. |
| 6,782,759 B2 | 8/2004 | Shank et al. |
| 6,842,148 B2 | 1/2005 | Hendler et al. |
| 6,889,578 B2 | 5/2005 | Spaziani et al. |
| 6,906,487 B2 | 6/2005 | de Frutos |
| 6,936,986 B2 | 8/2005 | Nuber |
| 6,946,811 B2 * | 9/2005 | Kikuta et al. ............... 318/468 |
| 6,946,853 B2 | 9/2005 | Gifford et al. |
| 6,968,746 B2 | 11/2005 | Shank et al. |
| 7,015,666 B2 | 3/2006 | Staus |
| 7,032,349 B2 | 4/2006 | Oberheide et al. |
| 7,034,487 B1 * | 4/2006 | Murphy et al. ............. 318/466 |
| 7,038,414 B2 | 5/2006 | Daniels et al. |
| 7,081,726 B2 | 7/2006 | Abe et al. |
| 7,162,928 B2 | 1/2007 | Shank et al. |
| 7,276,872 B2 * | 10/2007 | Nishimura et al. .......... 318/466 |
| 7,309,971 B2 * | 12/2007 | Honma et al. ............... 318/466 |
| 7,342,373 B2 * | 3/2008 | Newman et al. ............ 318/466 |
| 2002/0043948 A1 | 4/2002 | Ogasawara |
| 2002/0078758 A1 | 6/2002 | Suzuki et al. |
| 2002/0154039 A1 | 10/2002 | Lambert et al. |
| 2003/0005775 A1 | 1/2003 | Washeleski et al. |
| 2003/0052631 A1 | 3/2003 | Kusunoki |
| 2003/0056600 A1 | 3/2003 | Shank et al. |
| 2003/0089042 A1 | 5/2003 | Oberheide et al. |
| 2003/0151382 A1 | 8/2003 | Daniels et al. |
| 2004/0178924 A1 | 9/2004 | Gifford et al. |
| 2005/0012484 A1 | 1/2005 | Gifford et al. |
| 2005/0016290 A1 | 1/2005 | Shank et al. |
| 2005/0225175 A1 | 10/2005 | Maehara et al. |
| 2006/0117862 A1 | 6/2006 | Shank et al. |

FOREIGN PATENT DOCUMENTS

| | | |
|---|---|---|
| DE | 40 04 353 A1 | 8/1991 |
| DE | 198 10 077 A1 | 9/1998 |
| DE | 197 32 027 A | 1/1999 |
| DE | 197 32 027 A1 | 1/1999 |
| DE | 100 43 909 | 3/2001 |
| EP | 0 855 307 A2 | 7/1998 |
| EP | 1 154 110 A2 | 5/2001 |
| FR | 2 163 814 A | 7/1973 |
| FR | 2 744 548 | 8/1997 |
| JP | 06-160201 | 6/1994 |
| JP | 06-347436 | 12/1994 |
| JP | 07-055615 | 3/1995 |
| JP | 8029271 | 2/1996 |
| JP | 10-076843 | 3/1998 |
| JP | 11-124775 | 5/1999 |
| JP | 2000-249773 | 9/2000 |
| JP | 2001-165786 | 6/2001 |
| WO | WO 97/29391 | 8/1997 |
| WO | WO 98/22836 | 5/1998 |
| WO | WO 98/58821 | 12/1998 |
| WO | WO 01/14171 | 3/2001 |
| WO | WO 02/12669 A1 | 2/2002 |
| WO | WO 03/038220 A1 | 5/2003 |
| WO | WO 2005/059285 | 6/2005 |

* cited by examiner

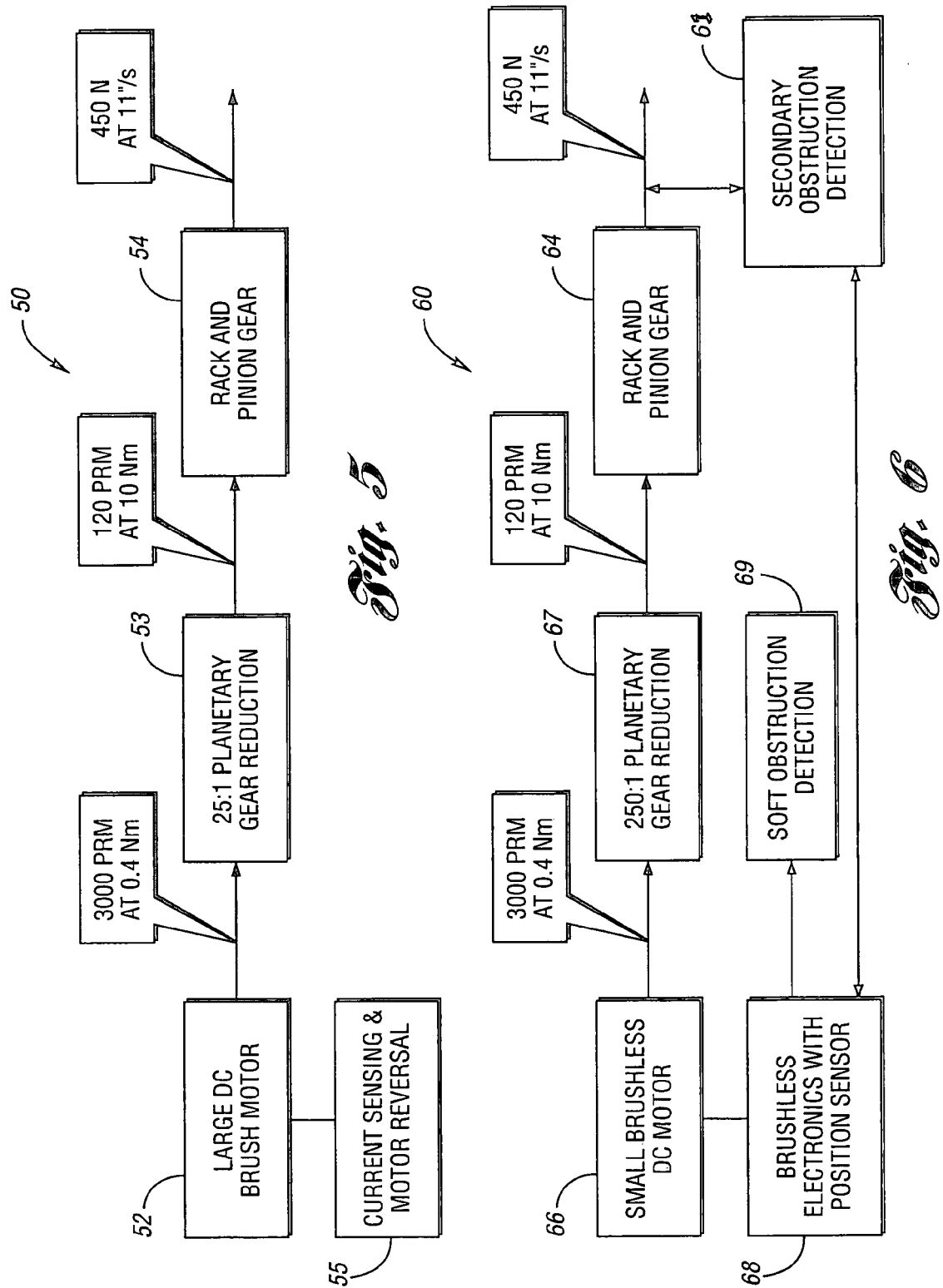

LOW SPEED FLOW    HIGH SPEED FLOW

POWERED PANEL MOVING SYSTEM

CROSS-REFERENCE TO RELATED APPLICATIONS

This application is a continuation of U.S. application Ser. No. 11/079,016, filed Mar. 11, 2005 now U.S. Pat. No. 7,312,591, which is hereby incorporated by reference in its entirety.

BACKGROUND OF THE INVENTION

1. Field of the Invention

The present invention generally relates to powered panel moving systems and, more particularly, to a powered panel moving system having electronic function circuitry integrated with electronic motor drive circuitry for providing additional functionality beyond driving a motor for movement of a panel.

2. Background Art

Standard automotive power window systems employ a brush type direct current (DC) motor with reduction gearing and suitable rotary-to-linear motion transformation fixtures to enable the motor to raise and lower a window. The requirement to drive the window completely into a compressible weather seal upon closing and withdraw the window upon opening can lead to forces driving the window having a magnitude of many Newtons (N).

Suitable fixtures for converting motor torque into the required closure force include cable systems, worm gears, planetary gears, and rack and pinion gearing systems, and the like. A typical fixture uses a gear system such as planetary gears to convert an approximately 3,000 rpm motor speed at approximately 0.4 Nm torque to an output rotation of 120 rpm at 10 Nm for a 3000/120=25:1 torque multiplication and speed reduction. The 120 rpm output is then converted to linear motion to drive a window with near stall forces of up to 450 N or more and unobstructed speeds of up to 11 inch/sec or more.

Unfortunately, a force having a magnitude of more than 100 N is sufficient to cause injury when a human body part become entrapped in a window being closed by this force. Techniques used to prevent such injury include placing a sensor in the closure region of the window such as described in U.S. Pat. No. 6,782,759. This has the disadvantage of requiring the sensor.

Another common approach is to monitor for either motor stall current or a rapid rise in motor current caused by the window hitting an obstruction. The motor is then reversed. However, reversal on motor current sensing allows a significant fraction of the window closure force to be applied to the obstruction if the obstruction is a soft object such as a child's neck. Soft obstructions can be sensed via motor current sensing if motor speed and/or window position are also measured as described in U.S. Pat. No. 6,064,165. This has the disadvantage of requiring additional speed and/or window position sensors.

It is well known to those skilled in the art of employing electric motors that the torque developed by a DC motor is generally a function of its size and the current it draws. The power of a DC motor is a function of the drive voltage, number of armature turns, and the applied current. A primary design trade that is made in motor applications is in motor size. For comparable input drive voltages and currents, a larger DC motor produces more torque than a smaller DC motor. However, a smaller DC motor can have approximately the same rated power as a larger DC motor for approximately the same input voltage and current, but will have it at a higher speed and lower torque. A smaller motor also has less surface area and mass. This can result in higher temperature operation for a smaller motor running at the same drive voltage and power of a larger motor. As much of the heating is caused by $I^2 R$ losses in the armature winding, a way to mitigate this problem is to use a smaller gauge wire and add windings and then operate at a higher voltage. However, many DC applications such as automotive applications have limitations in drive voltage. This causes all motor choices to work within a fixed drive voltage.

A second design trade is in terms of DC motor type. Conventional brush type DC motors have an armature wound on a rotor of the motor. This can limit the power rating of the motor as the armature can dissipate heat from the load current only through its shaft and bearings and heat rejection to air inside the motor case. In an alternative design, most commonly used on DC brush-less motors, the armature winding is moved to the stator with the rotor equipped with permanent magnets. This has the advantage of allowing the armature windings to be heat sunk directly to the motor frame. Then within the limitations of the heat sink provided to the motor frame, the motor can in some cases be run at higher currents than a comparable sized motor with internal armature windings.

A smaller motor offers a primary advantage in terms of the cost of its materials and the reduced weight and volume it takes up within a system it is powering. However, the design choice of a smaller motor has disadvantages. To match the power output of a larger motor, a smaller motor operates at higher speed. This offers at least four design challenges.

The first design challenge is that higher speed operation reduces the useful life of any brushes that are used. The second design challenge is that a more extreme "gear reduction"/"mechanical advantage" ratio is required to recover the equivalent torque that would be obtained from a larger motor at the same power rating. For instance, a motor operating at 3,000 rpm with 0.4 Nm torque requires a 25:1 gear ratio to get to a target 120 rpm at 10 Nm. However, a smaller 30,000 rpm motor with 0.04 Nm torque requires a 250:1 reduction gear ratio to match to the same target 120 rpm at 10 Nm. This could cause more wear and acoustic emissions than experienced with the lower gear ratio operating at lower motor speed. The third design challenge is that human hearing sensitivity is lower at the 50 Hz of a 3,000 rpm motor than at the 500 Hz of a 30,000 pm motor, resulting in the higher speed motor presenting a higher audio profile than would a larger, slower motor.

The fourth design challenge is in matching the motor to the mechanical coupling means used to match the motor's mechanical output to whatever component the motor is intended to move, e.g., an automotive power window or panel. Motors can be mounted on and move with the component or can be mounted to the structure on which the component moves. Gearing can be used to provide mechanical advantage such as in the employment of planetary gears and even gearbox transmissions as described in U.S. Pat. No. 6,515,399. Often gearing is used in combination with levers such as in the "arm and sector" configuration commonly used in automotive power window applications and described in U.S. Pat. No. 6,288,464 or in a rack and pinion configuration.

Flexible drive components such as cables (described in U.S. Pat. No. 4,186,524), tapes (described in U.S. Pat. No. 4,672,771), chains, and belts can be employed as well. In systems with the motor on the movable component, a worm gear, toothed track or slotted track, can be mounted on the stationary structure and be used to drive the motor and the component through the desired range of motion. Additionally, the motors can be applied to pumps to drive pneumatic or hydraulic pistons to affect the desired component motion. Clutches as described in U.S. Pat. No. 6,288,464 and brakes as described in U.S. Pat. No. 6,320,335 can be employed in combination with the mechanisms here described to engage or disengage torques and forces and/or to lock motion.

In the case of power windows and panels, the motor and mechanical coupling can be used to affect a linear or rotational sliding motion of the subject component or can be used to drive a hinged motion. Other motion types and mechanical coupling means are possible.

The problem of brush wear can be addressed by using a brush-less DC motor design. However, this introduces more cost via the additional electronics required for brush-less operation.

SUMMARY OF THE INVENTION

Accordingly, it is an object of the present invention to provide a powered panel moving system having electronic function circuitry integrated with electronic motor drive circuitry for providing additional functionality beyond driving a motor for movement of a panel.

It is another object of the present invention to provide a powered panel moving system having entrapment detection circuitry integrated with brush-less motor drive circuitry such that motor current, motor position, motor speed, and panel position measurements can be shared and used by both the entrapment detection circuitry and the brush-less motor drive circuitry.

It is a further object of the present invention to provide a powered panel moving system having powered panel control circuitry, entrapment detection circuitry, and brush-less motor drive circuitry integrated with one another such that a single controller can use powered panel control functions with entrapment detection functions and/or brush-less motor driving functions.

It is still another object of the present invention to provide a powered panel moving system having a small, high-speed motor configured with a higher mechanical advantage than used with a larger, low-speed motor such that cost savings from the resulting reduction in motor materials accommodates the cost of brush-less electronics used for the small, high-speed motor.

It is still a further object of the present invention to provide a powered panel moving system which is configured with a high-speed brush-less DC motor driving a high mechanical advantage reduction gear system in order to produce the torque and speed combination of a larger motor that would otherwise be required.

In carrying out the above objects and other objects, the present invention provides a powered panel moving system for moving a panel. The system includes a motor, electronic drive means, mechanical means, coupling means, and electronic anti-entrapment means which may all be located within a housing. The drive means drives the motor in order to rotate a rotor of the motor. The rotor has a rotational output in response to being driven. The mechanical means moves a panel upon being driven. The coupling means couples the rotational output of the rotor to the mechanical means in order drive the mechanical means for the mechanical means to move the panel. The anti-entrapment means controls the drive means to prevent the panel from entrapping an object. The drive means drives the motor based on measurement signals indicative of at least one of motor current, motor speed, and panel position. The drive means and the anti-entrapment means are integrated with one another such that the anti-entrapment means controls the drive means based on the same measurement signals.

The drive means may include motor current sensing means operable to infer a position of the rotor based on current of the motor. The drive means may include back emf sensing means on at least one motor phase coil for inferring a position of the rotor based on back emf of the motor. The drive means may include impedance sensing means on at least one motor phase coil for inferring a position of the rotor based on impedance of the motor.

The motor may be a DC brush-less motor such as a stepper motor. The DC motor preferably has a rated speed greater than 6,000 rpm. The drive means may include motor position sensing and indicating means for counting motor pulses to determine the position of the rotor.

The coupling means may include rotational mechanical advantage means for matching speed and torque output of the rotor to a lower speed, higher torque output for the mechanical means to move the panel. The rotational mechanical advantage means may include at least one gear meshed in a gear train.

The motor may be mounted so as to move with the panel and the mechanical means is mounted to a system in which the panel moves.

The mechanical means may include a flexible member to transmit torque or force for driving the panel. The mechanical means may include at least one of rack and pinion gearing, arm and sector gearing, planetary gearing, a worm gear, a toothed track or a slotted track for engagement with a gear, a pneumatic piston, a hydraulic piston, and a gearbox transmission. The mechanical means may include a clutching mechanism to enable engagement and disengagement of the motor to at least one of the coupling means and the mechanical means. The mechanical means may include a braking mechanism to lock the movement of the panel to a desired position upon the panel being in the desired position.

The moving of the panel may be about a hinged joint. The moving of the panel may be at least one of a linear translation and a rotational translation in a plane of the panel.

The anti-entrapment means may include analysis means operable with the motor current sensing means to determine presence of an obstruction to the motion of the panel based on the current of the motor prior to the panel applying destructive forces against the obstruction.

The anti-entrapment means may include analysis means operable for determining the presence of an obstruction to the motion of the panel based on at least one of the rotor position, the motor current, and the back emf of the motor. The anti-entrapment means may be operable to generate an indication of either end-of-travel of the panel or a motor stall condition based on at least one of the rotor position, the motor current, and the back emf of the motor.

The anti-entrapment means may include powered panel control means. The anti-entrapment means may include communication means for communicating one or more indications from the powered panel moving system to an external unit including at least one of a controller that controls part of the operation of the moving system and an indication system for providing an indication of a condition of the system.

The anti-entrapment means may include electronics for operating an obstruction detection sensor. The drive means and the anti-entrapment means may be realized within a single integrated circuit.

The advantages associated with the powered panel moving system in accordance with the present invention are numerous. For instance, the powered panel moving system is cost competitive to existing low cost powered panel moving systems while providing improved obstruction detection capability of more expensive powered panel moving systems.

Further, the powered panel moving system in accordance with the present invention provides a cost mitigation innovation for brush-less electronics as one aspect of the present invention. Other innovations of the powered panel moving system in accordance with the present invention address acoustic and higher gear ratio issues.

BRIEF DESCRIPTION OF THE DRAWINGS

FIG. 2a illustrates a variant of the two phase sensor-based brush-less motor shown in FIG. 1a;

FIG. 3a illustrates a further variant of the two phase sensor-based brush-less motor shown in FIG. 1a;

FIG. 5 illustrates a block diagram of an exemplary powered panel moving system;

FIG. 6 illustrates a block diagram of a powered panel moving system in accordance with the present invention;

DETAILED DESCRIPTION OF THE PREFERRED EMBODIMENT(S)

In high duty cycle applications, the requirement to dissipate heat can lead to the use of a larger motor running at a lower speed than would otherwise be desired. In such a case it could be advantageous to use an external armature for improved heat dissipation to allow operation with a smaller motor in order to realize lower motor material cost, weight, and volume. However, this change requires the use of brush-less electronics which impose an increased cost although brush-less designs are more reliable by eliminating brush wear and failure.

Figures 1A, 1B:
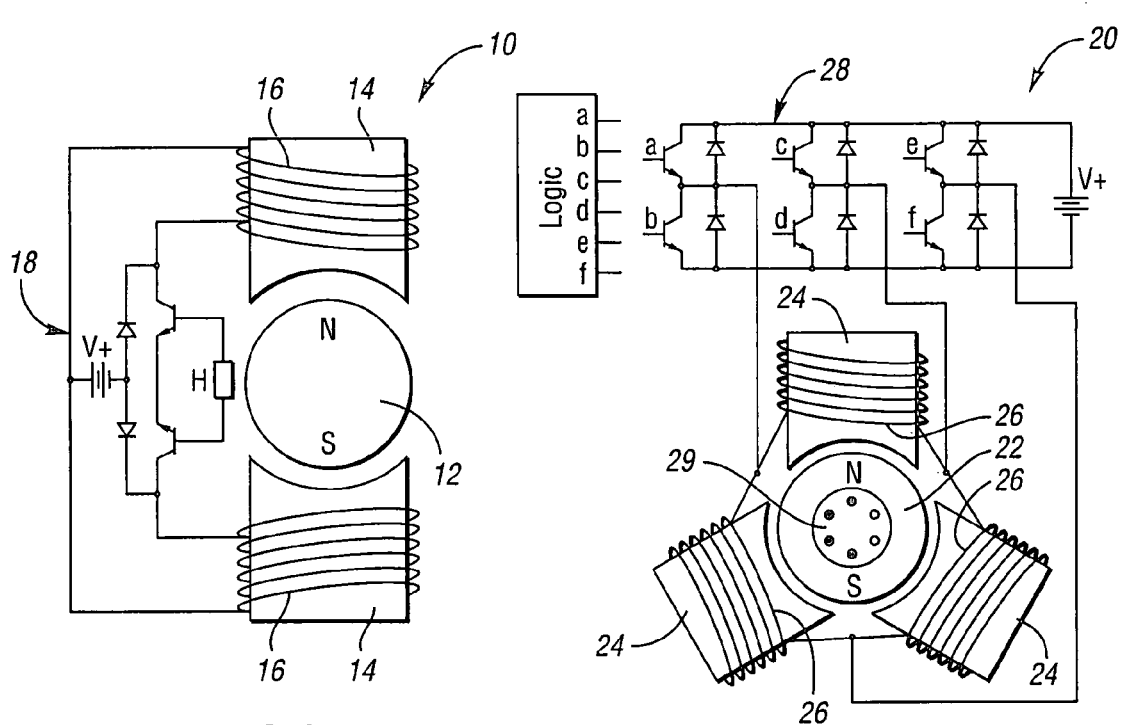
FIGS. 1a, 1b, and 1c respectively illustrate representative mechanical and electrical configurations of two, three, and four phase sensor-based brush-less motors for use with a powered panel moving system in accordance with the present invention.
Figure 1C:
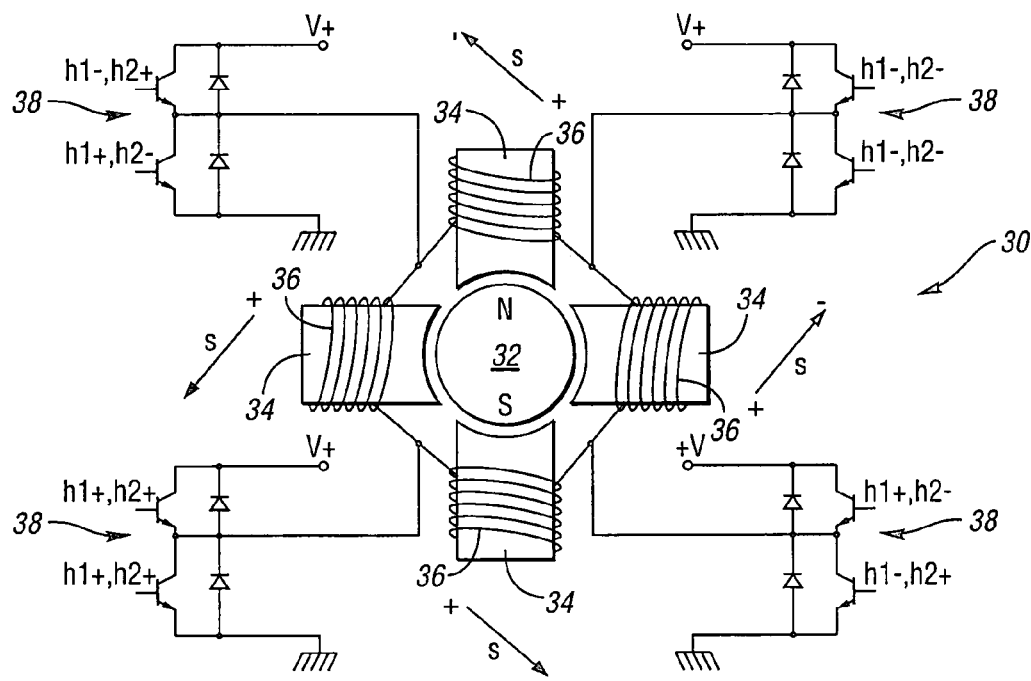

Among other variations, brush-less motor electronics are provided in two, three, and four phase variants with unipolar and bipolar excitations. FIGS. 1a, 1b, and 1c respectively illustrate representative mechanical and electrical configurations of two, three, and four phase sensor-based brush-less motors.

FIG. 1a illustrates a mechanical and electrical configuration of a two-phase sensor-based brush-less motor 10. Motor 10 includes a rotor 12 and two stator segments 14 with armature windings 16 wrapped around the stator segments. Armature windings 16 electrically connect to brush-less drive electronics 18. Motor 10 represents a two-phase unipolar drive configuration. As such, drive electronics 18 includes one diode and one transistor for each phase and position sensing, in this example a single hall sensor H, to determine which armature phase to apply with current.

FIG. 1b illustrates a mechanical and electrical configuration of a three-phase sensor-based brush-less motor 20. Motor 20 includes a rotor 22 and three stator segments 24 with armature windings 26 wrapped around the stator segments. Armature windings 26 electrically connect to brush-less drive electronics 28. Motor 20 represents a three-phase bipolar drive configuration. For a bipolar drive, the drive electronics includes an extra set of diodes and transistors. As such, drive electronics 28 includes two diodes and transistors per phase and position sensing, in this example a rotary encoder 29, to determine which armature phase to apply with current.

FIG. 1c illustrates a mechanical and electrical configuration of a four-phase sensor-based brush-less motor 30. Motor 30 includes a rotor 32 and four stator segments 34 with armature windings 36 wrapped around the stator segments. Armature windings 36 electrically connect to brush-less drive electronics 38. Motor 30 represents a four-phase bipolar drive configuration. As with drive electronics 28 of the three-phase motor 20 illustrated in FIG. 1b, drive electronics 38 includes two transistors and diodes per phase and position sensing for the bipolar drive. In the example of FIG. 1c, two Hall sensors h1, h2 are used for position sensing.

In the configurations of motors 10, 30 illustrated in FIGS. 1a and 1c, position sensing is achieved with switched Hall sensors (H; h1, h2) whose signals are used to directly activate the drive transistors of drive electronics 18, 38 for the various motor phases. Although this offers cost advantages, this type of sensing can give as much as +/−30 degrees of inaccuracy in the point at which a given armature phase is driven. This can cause a loss of efficiency and power.

Figure 2A:
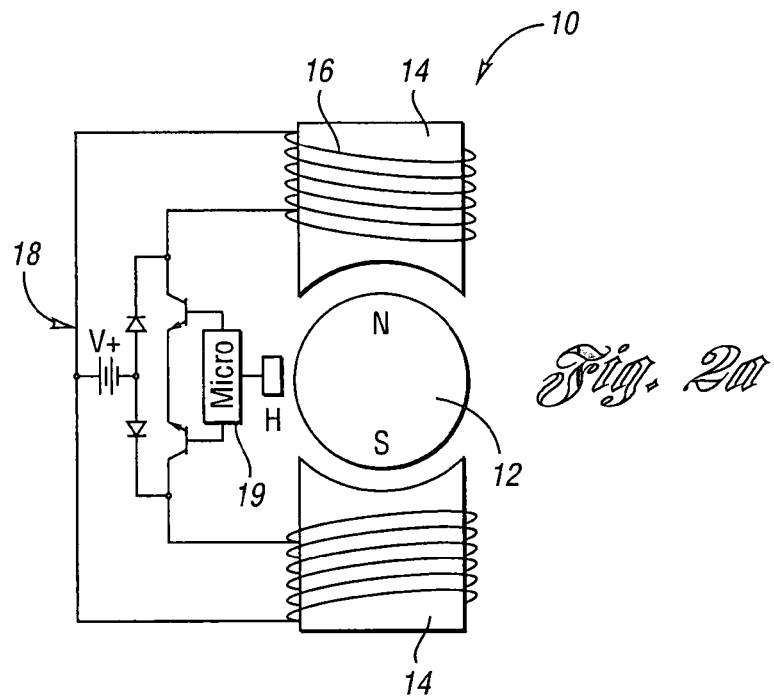

As shown in FIG. 2a, with continual reference to FIG. 1a, drive electronics 18 of motor 10 includes a micro-controller 19 to process the signals from analog Hall sensor H in a tracking mode in order to more accurately determine the position of rotor 12 and thereby provide more optimal switching to maximize motor efficiency and power. However, added circuitry in the form of micro-controller 19 adds costs to drive electronics 18.

Figure 2B:
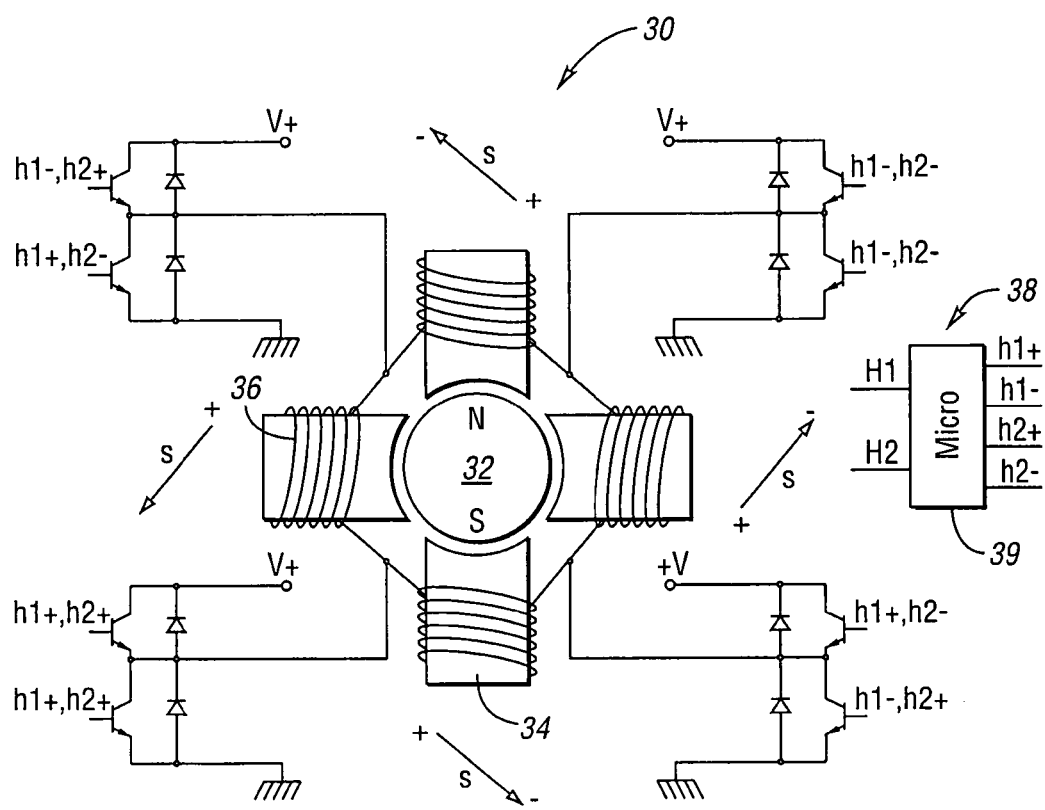
FIG. 2b illustrates a variant of the four phase sensor-based brush-less motor shown in FIG. 1c.

Likewise, as shown in FIG. 2b, with continual reference to FIG. 1c, drive electronics 38 of motor 30 includes a micro-controller 39 to process the signals from analog Hall sensors H1, H2 in a tracking mode in order to more accurately determine the position of rotor 32 and thereby provide more optimal switching to maximize motor efficiency and power. Again, however, added circuitry in the form of micro-controller 39 adds costs to drive electronics 38.

Other sensor options include optical rotary encoders and resolvers such as rotary encoder 29 of motor 20 shown in FIG. 1b. Such rotary encoders and resolvers also impose cost penalties from the need for additional components and/or processing.

Motors 10, 20, 30 are shown respectively with two-pole rotors 12, 22, 32. However, there are numerous applications with rotors having more than two poles and there are numerous applications with rotors having more than four poles as well. In general, as either the number of rotor poles or armature phases increases, the requisite position sensing accuracy increases. Increased armature phases can also increase the complexity of the required switching drive electronics and logic.

Figure 3A:
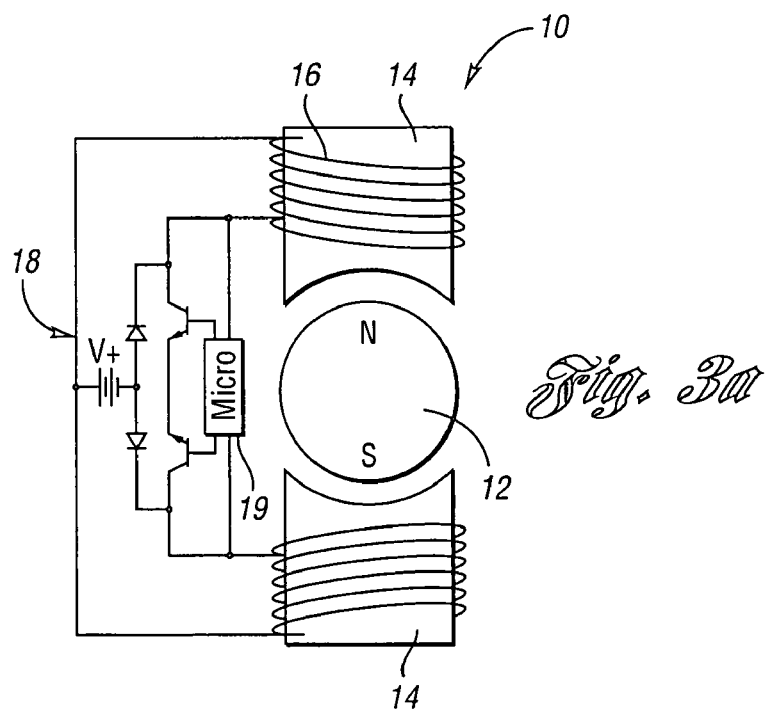

An additional approach that can be taken in brush-less control is to use the motor itself to provide the position determination. As shown in FIG. 3a, with continual reference to FIG. 2a, micro-controller 19 of drive electronics 18 receives sense signals taken from motor 10. Micro-controller 19 processes these signals to infer position of rotor 12 of motor 10. Micro-controller 19 then selects the appropriate drive components of drive electronics 18 which, in this case, is one of the two transistors in order to drive motor 10.

Figure 3B:
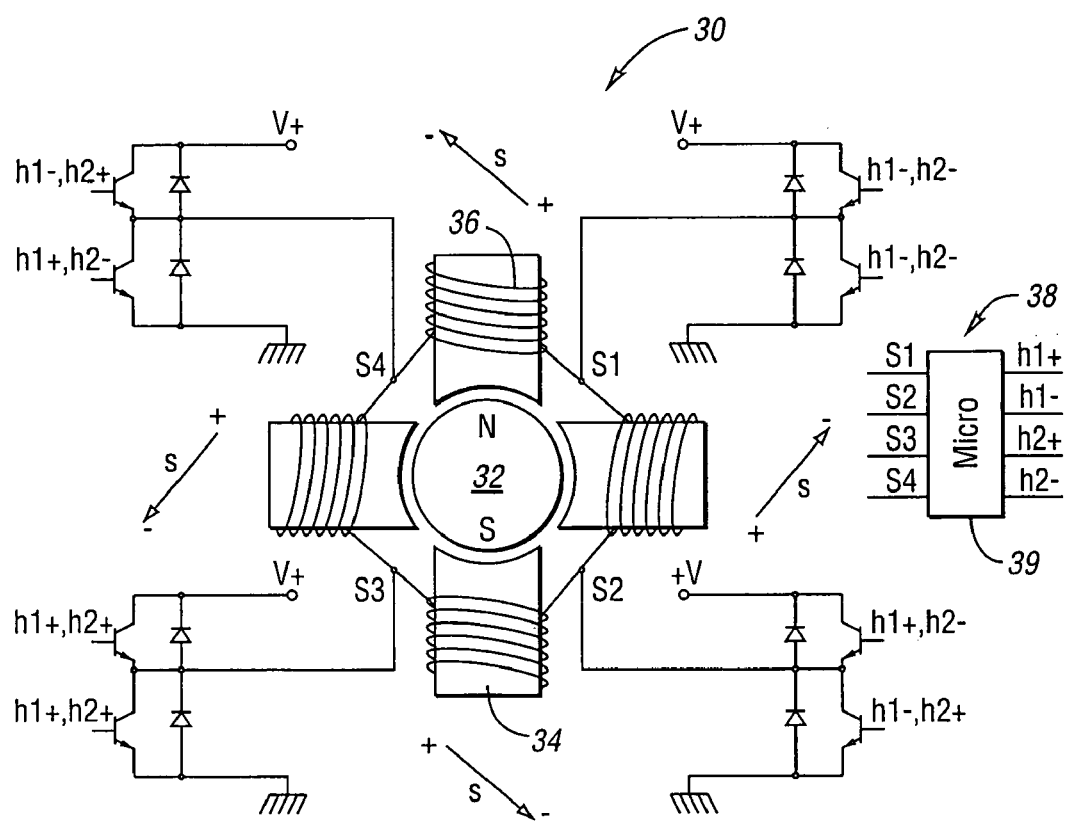
FIG. 3b illustrates a further variant of the four phase sensor-based brush-less motor shown in FIG. 1c.

Likewise, as shown in FIG. 3b, with continual reference to FIG. 2b, micro-controller 39 of drive electronics 38 receives sense signals (S1, S2, S3, S4) taken from motor 30. Micro-controller 39 processes these signals to infer position of rotor 32 of motor 30. Micro-controller 39 then selects the appropriate drive components (i.e., the transistors) of drive electronics 38 in order to drive motor 30.

Common methods used include (i) sensing the back emf from un-driven phase coils and (ii) measuring phase impedance via brief sacrificial current pulses and/or application of a low amplitude high-frequency sense signal. The high-frequency components in the motor drive voltage or current originating from the square or trapezoidal motor drive waveforms could also be evaluated to infer impedance of the driven phases. Another approach is to add additional sense coils in combination with back emf and/or impedance sensing.

Although these approaches offer advantages in terms of motor position sensing accuracy and elimination of sensors they do have certain limitations. Back emf sensing requires the rotor to be rotating or turning. Impedance sensing can add torque if sacrificial sensing pulses are used or add expense if a high-frequency low-amplitude sense signal is applied. Additional sense coils are an added expense in and of themselves.

In powered panel applications such as automotive power windows, the potential for entrapment and injury has lead to the employment of sensors and electronics to detect entrapment and reverse the drive motor before serious injury occurs. One method of entrapment detection is to monitor one or more motor parameters such as speed, drive voltage, and armature current and/or to monitor panel parameters such as position and speed as described in U.S. Pat. No. 6,064,165. Other methods of obstruction detection include the employment of one or more additional sensors to sense entrapment as described in U.S. Pub. No. 2003/0056600. These methods add expense and complexity to a power panel system by requiring additional components and processing.

In general, the motion of a powered panel (i.e., a powered window) is slowed or halted upon entrapment. When this happens, any direct mechanical linkage between the panel and a DC motor driving the panel slows motor rotation which in turn lowers the back emf of the motor. This generally results in increased current and torque. Entrapment can then be inferred by either detecting the increase in motor current or the decrease in motor or panel speed. In some applications, the nominal speed of a powered panel and the associated motor back emf is position dependent. This speed versus position variation can be a result of the finite acceleration time at the start of travel and variations in resistance and mechanical advantage along the travel path of the panel. This motivates the use of position tracking as described in U.S. Pat. No. 6,064,165.

In simple entrapment detection, motor current is monitored and entrapment is inferred when the current exceeds a fixed threshold where the threshold matches the worst-case motor current draw during a normal panel closure. In cases where there is indirect mechanical coupling to the motor such as in pneumatic or hydraulic linkages, entrapment detection via detection of motor stalling or slowing may not be possible.

Another simple method of entrapment detection is to detect for a drop in the panel closing velocity below a predetermined threshold representing the worst-case lowest velocity during panel closure. This may require a separate speed sensor for the panel, especially where there is indirect mechanical linkage decoupling motor speed from panel speed.

A variation on these two simple entrapment detection methods is to infer entrapment from a rate of current increase or velocity decrease that exceeds predetermined worst-case values. A complication to this is the large starting current at the beginning of travel and stall current and drop in velocity at closure where in some cases it is necessary to drive a panel into a weather seal. This can lead to a requirement for absolute position detection and/or end-and-beginning of travel detection. Indirect mechanical linkages provide complications to this approach as well as motor speed can be decoupled or non-linearly coupled to panel speed.

Dedicated sensors and/or systems that can be employed for entrapment detection include proximity and touch sensors such as described in U.S. Pub. No. 2003/0056600, as well as optical and conductive sensors among others. As noted, these systems have the drawback of adding cost through adding components as well as installation.

In a first aspect of the powered panel moving system in accordance with the present invention, all or a portion of the entrapment detection electronics and processing is integrated with the drive electronics of a brush-less motor. A first advantage of this configuration is in terms of simplifying packaging and installation as a result of component reduction and system simplification.

A second advantage of this configuration is that measurements such as motor current, motor speed, and panel position that are used for both motor control and entrapment detection can be shared. This saves the expense of duplicating these measurements in separate systems and provides a value added for each function that is used twice. In this way, the added expense of brush-less drive electronics is compensated for by the added functionality of entrapment detection that can be realized using measures and/or components common to both motor drive control and entrapment detection.

For instance, a current measuring capability for sensor-less motor position sensing via impedance measurement can also be used to provide drive current measurement for entrapment detection. Similarly, the derived motor position can be processed to provide estimates of motor or panel speed, position, and acceleration. These, especially when combined with drive current sensing, can be used for entrapment detection.

A further aspect of the powered panel moving system in accordance with the present invention is to integrate powered panel control electronics with the brush-less motor drive electronics and/or with the entrapment detection electronics to form a combined power panel system. As an example, powered panel control electronics includes electronics for "express open" and "express close" panel functions. As such, in response to an operator pressing an express close button, the window closes without requiring the operator to continuously press the express close button.

Figure 4:
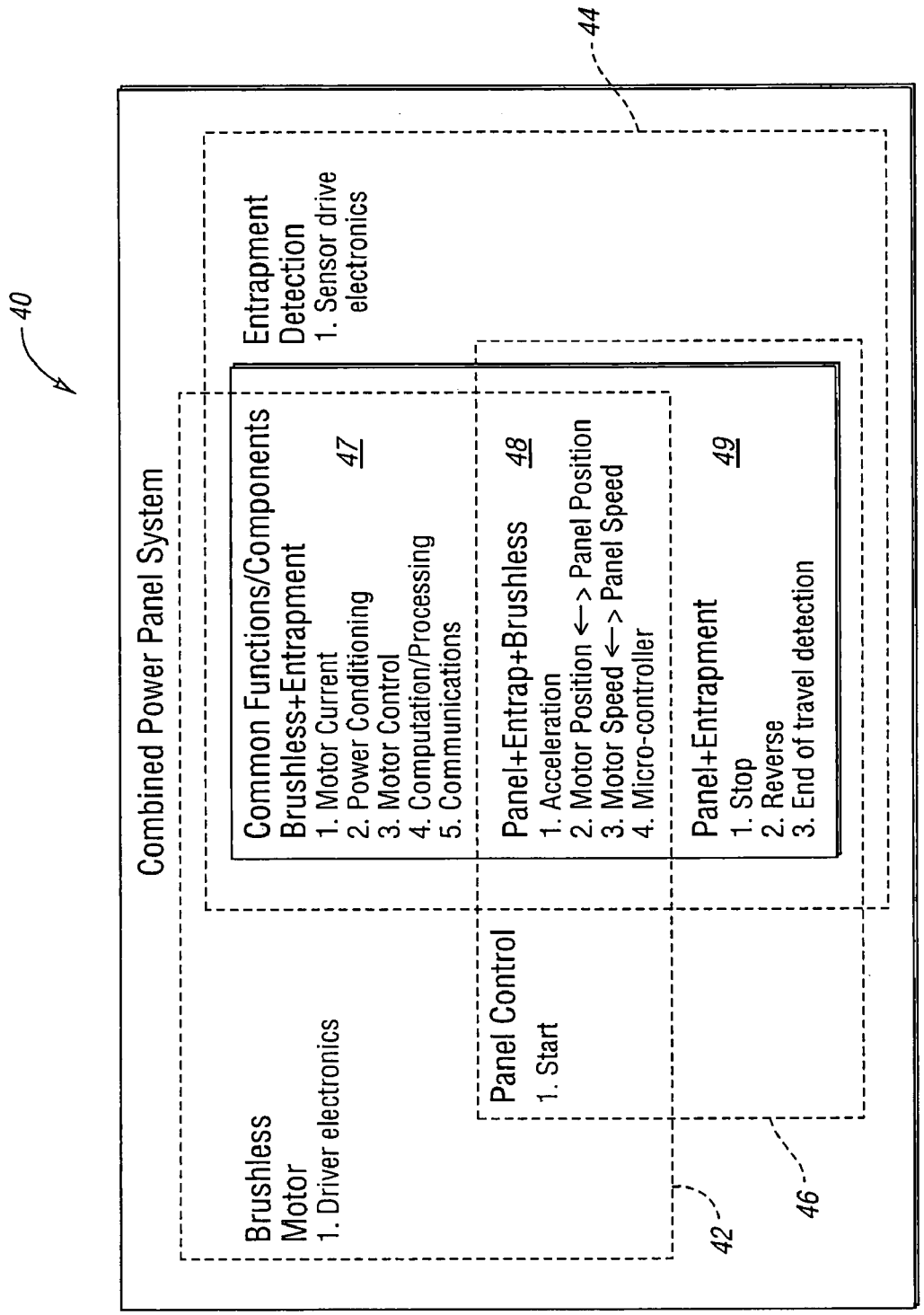
FIG. 4 illustrates a chart which summarizes functions of brush-less motor drive electronics, entrapment detection electronics, and powered panel control electronics which can be integrated with one another for use with a powered panel moving system in accordance with the present invention.
Figures 7A, 7B:
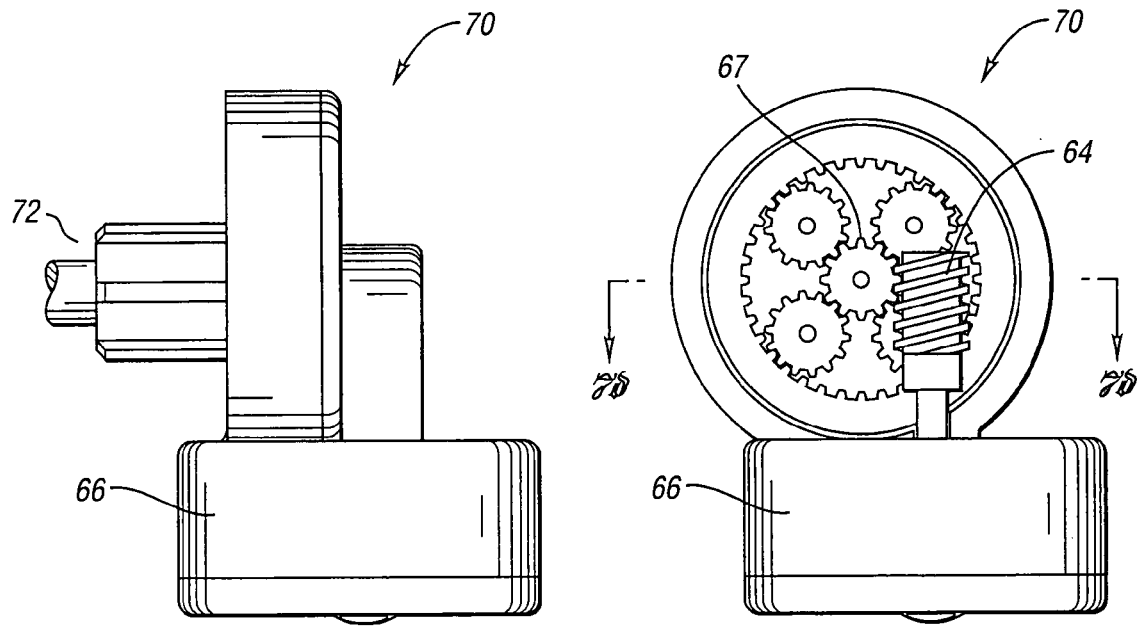
FIGS. 7a, 7b, 7c, and 7d respectively illustrate different views of an integrated motor assembly configuration for use with a powered panel moving system in accordance with the present invention.
Figures 7C, 7D:
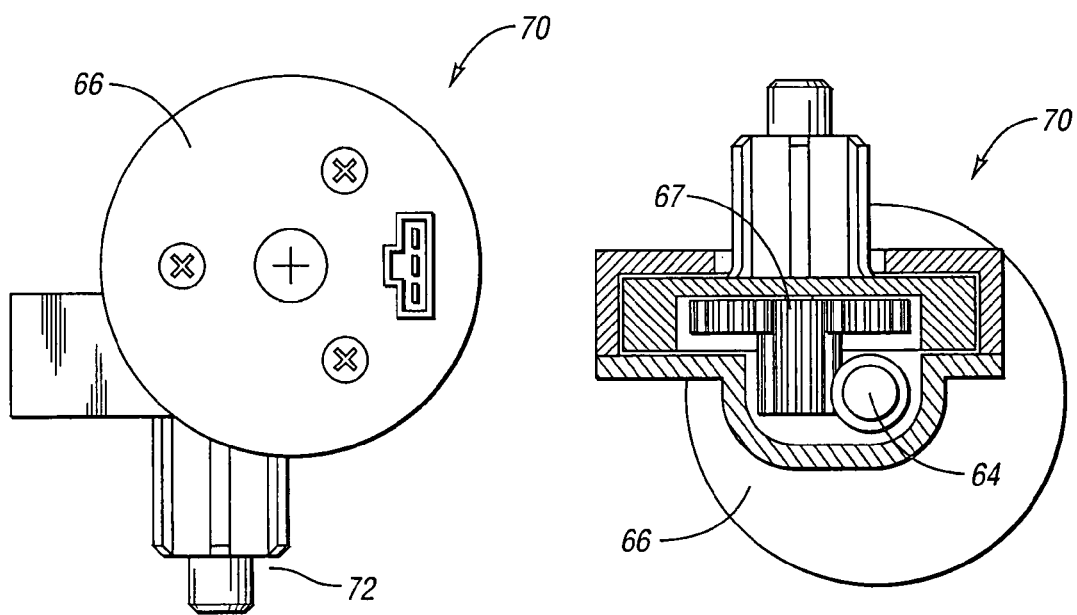

Referring now to FIG. 4, a chart 40 generally summarizes functions of brush-less motor drive electronics 42, functions of entrapment detection electronics 44, and functions of powered panel control electronics 46 that can be integrated with one another in accordance with the present invention. In general, brush-less motor control functions are carried out by brush-less motor drive electronics 42, entrapment detection functions are carried out by sensor drive electronics 44, and powered panel control functions are carried out by panel control electronics 46. As indicated, brush-less motor drive electronics 42, sensor drive electronics 44, and panel control electronics 46 may be integrated with one another in various combinations to form a combined power panel system.

For example, block 47 lists common functions provided by brush-less motor drive electronics 42 and entrapment detection electronics 44 that can be used for brush-less motor control and entrapment detection. Block 48 lists common functions provided by brush-less motor drive electronics 42, entrapment detection electronics 44, and powered panel control electronics 46 that can be used for brush-less motor control, entrapment detection, and powered panel control. Block 49 lists common functions provided by entrapment detection electronics 44 and powered panel control electronics 46 that can be used for entrapment detection and powered panel control. Although no single controller would necessarily use all of these functions, many combinations are possible where at least one of these functions would be common to brush-less drive electronics 42 and entrapment detection electronics 44 and/or power panel control electronics 46.

In some powered panel applications, it may be desirable to employ a smaller motor to reduce material costs and/or to meet size and weight constraints. However, as indicated above, a smaller motor runs at a higher speed and at a lower torque to deliver the power of a larger motor. Increased motor speeds result in greater brush wear. As a result, the use of a smaller, faster motor leads to the requirement for brush-less electronics. To recover the torque and panel driving force developed with a slower, larger motor, a high-speed motor must be configured with a higher mechanical advantage linkage than that used with the larger motor.

With reference to FIGS. 5 and 6, it is a further aspect of the present invention to provide a powered panel moving system which is configured with a high-speed brush-less DC motor driving a high mechanical advantage reduction gear system in order to produce the torque and speed combination of a larger motor that would otherwise be required.

FIG. 5 illustrates a sample powered window moving system 50. System 50 includes a large DC brush motor 52 which is associated with current sensing and motor reversal electronic circuitry 55. As an example, brush motor 52 operates at a motor speed of 3,000 rpm at 0.4 Nm torque. A 25:1 planetary gear reduction 53 converts the 3,000 rpm motor speed at 0.4 Nm torque to an output rotation of 120 rpm at 10 Nm for a 3,000/120=25:1 torque multiplication and speed reduction. A rack and pinion gear 54 converts the 120 rpm output to linear motion to drive a window with near stall forces of 450 N or more and unobstructed speeds of 11 inch/sec or more.

FIG. 6 illustrates a powered window moving system 60 in accordance with the present invention. In general, system 60 is configured with a small brush-less DC motor 66 which drives a high mechanical advantage gear reduction system 67 to produce the torque and speed combination of a brush motor (such as large DC brush motor 52) that would otherwise be used. To this end, brush-less motor 66 operates at a motor speed of 30,000 rpm at 0.04 Nm torque. A 250:1 planetary gear reduction 67 converts the 30,000 rpm at 0.04 Nm torque to an output rotation of 120 rpm at 10 Nm for a 30,000/120=250:1 torque multiplication and speed reduction. A rack and pinion gear 64 converts the 120 rpm output to linear motion to drive a window with near stall forces of 450 N or more and unobstructed speeds of 11 inch/sec or more. The cost savings the resulting reduction in motor materials (i.e., the cost savings between small brush-less motor 66 and large brush motor 52) is then applied to offset the cost of brush-less motor drive electronics 68.

Note that the specific speed and torque values in FIGS. 5 and 6 are provided by way of example as being typical for an automotive power window system. As such, other speed and torque combinations are possible. Similarly, the rack and pinion and planetary gear mechanical coupling (64, 67; 54, 53) is shown by way of example. As such, other mechanical coupling configurations such as those already described are also possible.

As shown in FIG. 6, powered window moving system 60 in accordance with the present invention may further include a secondary obstruction sensor or sensing system 61. Secondary obstruction sensor 61 is placed in the vicinity of the window and is generally operable to detect the presence of an object such as a human body part in the vicinity of the window. As such, secondary obstruction sensor 61 is generally operable to detect entrapment and possible entrapment of objects by the window. Secondary obstruction sensor 61 may be in the form of a capacitance sensor such as described in U.S. Pub. No. 2003/0056600. In this embodiment, a cost savings is realized in the employment of secondary obstruction sensor 61 by integrating all or part of its electronics into brush-less motor drive electronics 68.

With reference to FIGS. 5 and 6, powered window moving system 60 in accordance with the present invention is configured to have a cost and performance advantage over existing moving systems by using a smaller lower cost (but lower torque and higher speed) brush-less motor 66 in place of a larger brush motor such as large brush motor 52. The mechanical advantage mechanism 53 used with large brush motor 52 in system 50 is replaced with a larger ratio mechanical advantage mechanism 67 in system 60. The cost savings of smaller brush-less motor 66 is then applied to offset the cost of brush-less motor drive electronics 68.

Further, the position sensing of brush-less motor drive electronics 68 is combined with additional soft obstruction detection electronics 69 which provides detection methodology as described in U.S. Pat. No. 6,064,165. Such detection methodology provided by obstruction detection electronics 69 senses obstructions via motor current sensing as described in U.S. Pat. No. 6,064,165. As described, the detection methodology carried out by obstruction detection electronics 69 is done by monitoring one or more motor parameters such as speed, drive voltage, and armature current and/or monitoring window parameters such as position and speed in order to carry out position tracking.

Referring now to FIGS. 7a, 7b, 7c, and 7d, with continual reference to FIG. 6, different views of an integrated motor assembly configuration 70 in accordance with the present invention are shown. The integrated motor assembly configuration has cost and performance advantages. Both brush type and brush-less motor designs can benefit from this integrated motor assembly configuration. As shown in FIGS. 7a, 7b, 7c, and 7d, high-speed brush-less DC motor 66 integrates with a rack and pinion gear 64 plus planetary gear mechanical coupling 67 for direct interface to a drive component 72.

Figure 8:
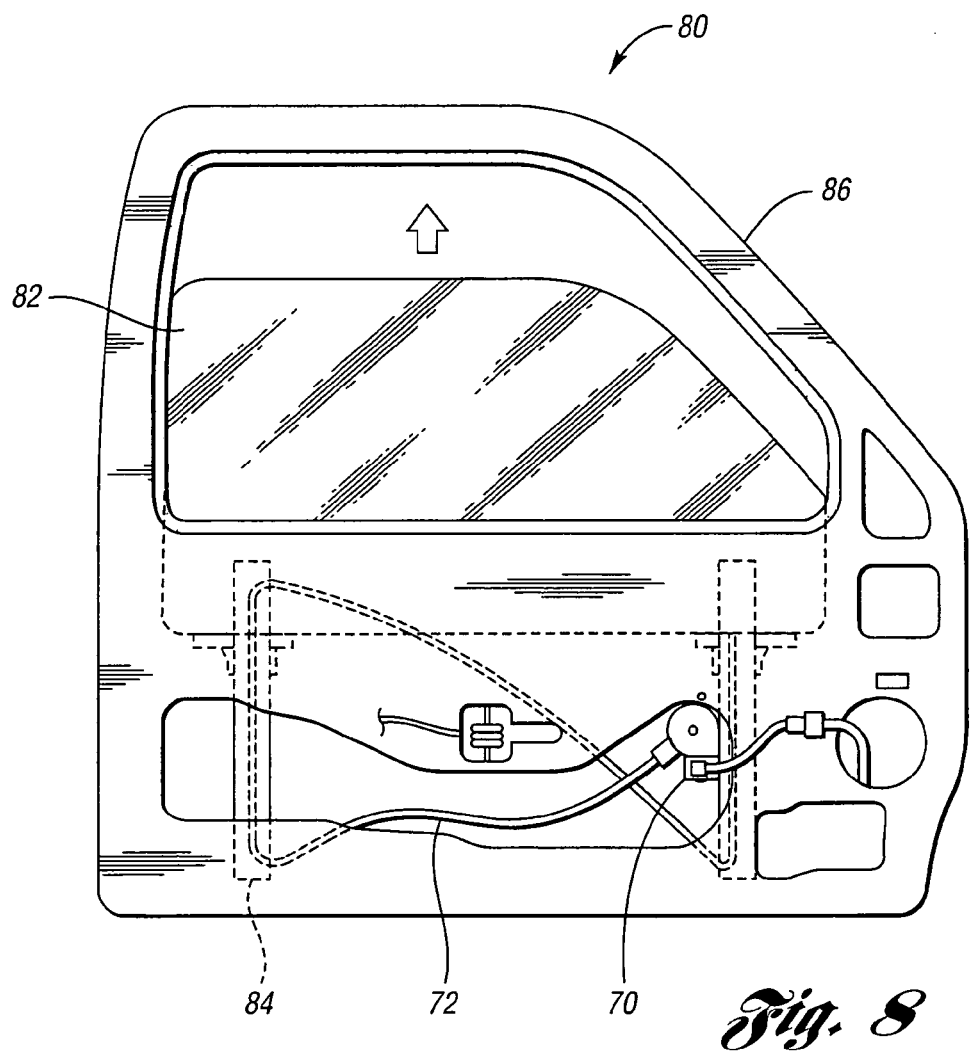
FIG. 8 illustrates a powered panel moving system having an integrated motor assembly in accordance with the present invention.

Further visualization is provided in FIG. 8 which shows integrated motor assembly 70 as it might appear in a powered window moving system 80 in accordance with the present invention. Integrated motor assembly 70 interfaces to a cable drive component 72 to move a window 82 on a stationary track 84. Integrated motor assembly 70 moves window 82 to a fully closed position in which the window engages a weather seal provided on a door frame 86. The simplified package captures all electronics for processing entrapment detection, brush-less motor control, and user functionality into integrated motor drive assembly 70.

A further embodiment of the powered panel moving system in accordance with the present invention operates to eliminate noise and reliability issues related to reduction gearing. This is done by replacing the reduction gear with a torque converter incorporated within the motor by direct attachment of an impeller pump to the rotor of the motor or a shaft from the rotor and direct attachment of a turbine to an output shaft. A fluid or pneumatic coupling to the turbine is then used to transmit torque from the rotor to the output shaft connected to the turbine. This method can be applied to brushed motors, brush-less motors, and externally or internally wound armature AC or DC motors.

Figure 9:
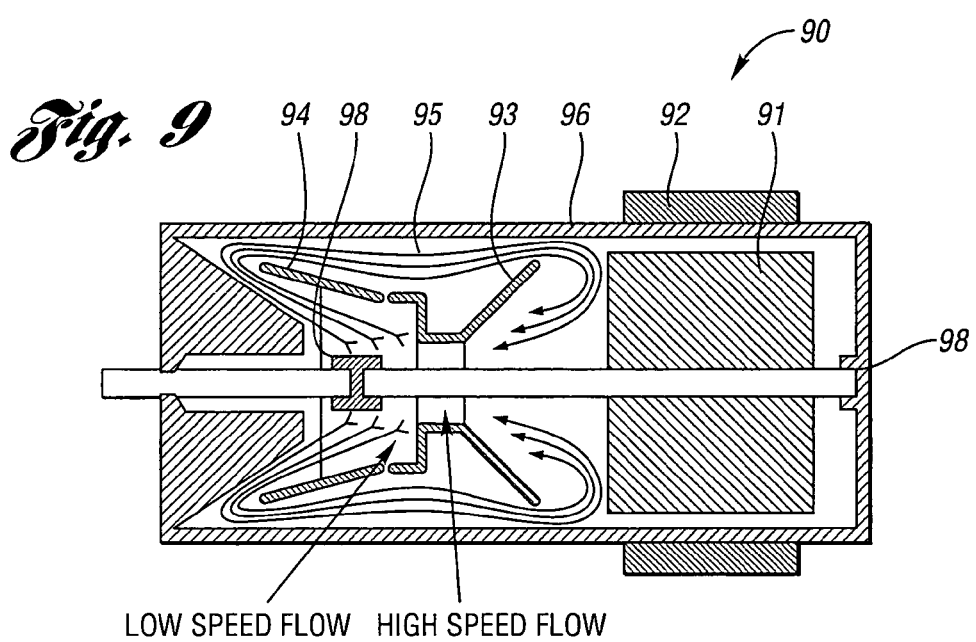
FIG. 9 illustrates a motor assembly configuration for use with a powered panel moving system in accordance with the present invention.

By way of example, FIG. 9 illustrates a realization of this embodiment of the present invention with a brush-less DC motor 90. In this approach, the conventional brush-less DC configuration of a permanent magnet rotor 91 with electronically switched stator coils 92 is used. However, rotor 91 has no direct mechanical connection to an output shaft of the system. Instead, rotor 91 incorporates a fluid (or alternatively a pneumatic) impeller pump 93 that couples to an output turbine 94 via a fluid (or alternatively a pneumatic) coupling 95. In this configuration of pump 93 with coupling 95 to turbine 94 there can be torque multiplication of the torque delivered from the pump to the output torque of the turbine when the pump rotates faster than the turbine.

In brush-less DC motor 90, pump 93, turbine 94, and fluid channels are sized and shaped so as to provide an optimal coupling at a desired range of rotation ratio of pump rotation to turbine rotation over a desired range of pump speeds. These components are also sized and shaped so as to achieve a desired range of torque multiplication over a desired range of pump speeds with a desired range of pump to turbine speed ratios. Typically, the coupling is made most efficient at the rated speed and torque of the motor when the turbine is at a preferred speed and torque.

Designing for specific rotation ratios and torque multiplications is readily achieved by techniques available to those skilled in the art of turbine design. Even at the designed operating point there will be mechanical efficiency losses to the fluid. If the output torque is not sufficient to drive the load of turbine 94, then the turbine rotation slows resulting in an increase in turbine torque in accordance with the manner of conventional fluid based torque converters as presently employed in automotive drive train applications.

This approach of combining a motor (nominally brush-less DC) with a fluid (or pneumatic) torque converter offers reliability, cost, and noise advantages via the elimination of the complexity, mechanical contact, and wearing of reduction gearing. It also offers the advantage of a variable and self-matching mechanical advantage via the torque multiplication behavior of the fluid coupling of appropriately configured pumps and turbines. This can provide significant output torque at low speeds and/or at start-up without significantly increasing the mechanical load on the motor.

This offers a further advantage in being able to increase torque without having the motor draw significantly more current as would be the case with a fixed ratio gear train. It also allows the motor to operate near its rated speed so as to maximize its power input to the fluid. In fixed ratio couplings such as a gear train, an increased torque load necessarily slows the motor taking it away from its rated speed where the power delivered to the rotor necessarily drops. With a fluid coupling the increased torque load does not slow the motor.

A disadvantage is that the fluid coupling may not be as mechanically efficient as a gear train. This inefficiency can force the motor size or drive current to be increased to compensate for the loss of power. A further disadvantage is that the lost power goes into heat in the torque converter. However, for intermittent as opposed to continuous operation such as is seen in power window systems, the heating is not a concern. Similarly, in applications where sufficient heat sinking can be provided the heating is not a concern. As there is no direct mechanical coupling between the motor and the turbine, it may be necessary to incorporate a mechanical brake or lock to hold the window in position after the motor stops turning.

Also, in more advanced applications where motor speed control is available; the fluid coupling could be intermittently bypassed by use of an inline clutching mechanism to mechanically lock the motion of the rotor to that of the turbine in a fixed speed ratio. The clutch would be disengaged for motor launch or when there was an increase in torque demand that slows the motor unacceptably from its rated speed. Additional salient features of this approach are that to the extent that the rotor and turbine can be kept within the same housing 96, the number of moving parts and mechanical connections can be minimized. Further, if the design allows the fluid to contact all or part of the rotor, the heat sinking of the rotor can be improved. This could be of particular advantage if the armature windings are on the rotor. The use of journal bearings 98 on both ends of rotor 91 and one end of turbine 94 allows these bearings to be isolated from any outside contaminants and, if desired, be lubricated by the fluid itself. An additional design consideration is to keep high pressure or rapidly moving fluid away from the region of the non-journal turbine bearing.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A powered panel moving system for moving a panel, the system comprising:
   a motor having a rotor;
   electronic drive means for driving the motor in order to rotate the rotor, wherein the rotor has a rotational output in response to being driven;
   mechanical means for moving a panel upon being driven;
   coupling means for coupling the rotational output of the rotor to the mechanical means in order drive the mechanical means for the mechanical means to move the panel; and
   electronic anti-entrapment means for controlling the drive means to prevent the panel from entrapping an object;
   wherein the drive means drives the motor based on measurement signals indicative of at least one of motor current, motor speed, and panel position, wherein the drive means and the anti-entrapment means are integrated with one another such that the anti-entrapment means controls the drive means based on the same measurement signals.

2. The system of claim 1 wherein:
   the drive means includes motor current sensing means operable to infer a position of the rotor based on current of the motor.

3. The system of claim 1 wherein:
   the motor includes at least one motor phase coil;
   wherein the drive means includes back emf sensing means on the least one motor phase coil, wherein the back emf sensing means is operable to infer a position of the rotor based on back emf of the motor.

4. The system of claim 1 wherein:
the motor includes at least one motor phase coil;
wherein the drive means includes impedance sensing means on the at least one motor phase coil, wherein the impedance sensing means is operable to infer a position of the rotor based on impedance of the motor.

5. The system of claim 1 wherein:
the motor is a DC brush-less motor;
wherein the drive means includes motor position sensing and indicating means.

6. The system of claim 5 wherein:
the DC brush-less motor is a stepper motor;
wherein the motor position sensing and indicating means counts motor pulses to determine the position of the rotor.

7. The system of claim 1 wherein:
the coupling means includes rotational mechanical advantage means for matching speed and torque output of the rotor to a lower speed, higher torque output for the mechanical means to move the panel, wherein the rotational mechanical advantage means includes at least one gear meshed in a gear train.

8. The system of claim 1 wherein:
the motor is mounted so as to move with the panel and the mechanical means is mounted to a system in which the panel moves.

9. The system of claim 1 wherein:
the mechanical means includes a flexible member to transmit torque or force for driving the panel.

10. The system of claim 1 wherein:
the mechanical means includes at least one of rack and pinion gearing, arm and sector gearing, planetary gearing, a worm gear, a toothed track or a slotted track for engagement with a gear, a pneumatic piston, a hydraulic piston, and a gearbox transmission.

11. The system of claim 1 wherein:
the mechanical means includes a clutching mechanism to enable engagement and disengagement of the motor to at least one of the coupling means and the mechanical means, the mechanical means further includes a braking mechanism to lock the movement of the panel to a desired position upon the panel being in the desired position.

12. The system of claim 1 wherein:
the moving of the panel is about a hinged joint.

13. The system of claim 1 wherein:
the moving of the panel is at least one of a linear translation and a rotational translation in a plane of the panel.

14. The system of claim 2 wherein:
the anti-entrapment means includes analysis means operable with the motor current sensing means to determine presence of an obstruction to the motion of the panel based on the current of the motor prior to the panel applying destructive forces against the obstruction.

15. The system of claim 2 wherein:
the anti-entrapment means includes analysis means operable for determining the presence of an obstruction to the motion of the panel based on at least one of the rotor position and the motor current.

16. The system of claim 3 wherein:
the anti-entrapment means includes analysis means operable for determining the presence of an obstruction to the motion of the panel based on at least one of the rotor position and the back emf of the motor.

17. The system of claim 2 wherein:
the anti-entrapment means is operable with the motor current sensing means to generate an indication of end-of-travel of the panel based on at least one of the rotor position and the motor current.

18. The system of claim 3 wherein:
the anti-entrapment means is operable with the back emf sensing means to generate an indication of end-of-travel of the panel based on at least one of the rotor position motor and the back emf of the motor.

19. The system of claim 2 wherein:
the anti-entrapment means is operable with the motor current sensing means to generate an indication of a motor stall condition based on at least one of the rotor position and the motor current.

20. The system of claim 3 wherein:
the anti-entrapment means is operable with the back emf sensing means to generate an indication of a motor stall condition based on at least one of the rotor position and the back emf of the motor.

21. The system of claim 1 wherein:
the anti-entrapment means includes powered panel control means.

22. The system of claim 1 wherein:
the anti-entrapment means includes communication means for communicating one or more indications from the powered panel moving system to an external unit, wherein the external unit includes at least one of a controller that controls part of the operation of the moving system and an indication system for providing an indication of a condition of the system.

23. The system of claim 1 wherein:
the anti-entrapment means includes electronics for operating an obstruction detection sensor.

24. The system of claim 5 wherein:
the DC motor has a rated speed greater than 6,000 rpm.

25. The system of claim 1 wherein:
the drive means and the anti-entrapment means are realized within a single integrated circuit.

* * * * *